US005079964A

United States Patent [19]

Hamada et al.

[11] Patent Number: 5,079,964

[45] Date of Patent: Jan. 14, 1992

[54] ACTUATOR FOR DOOR LOCKING APPARATUS FOR VEHICLE

[75] Inventors: Yoshikazu Hamada, Utsunomiya; Tetsuzo Igata, Nirasaki, both of Japan

[73] Assignee: Mitsui Kinzoku Kogyo Kabushiki Kaisha, Tokyo, Japan

[21] Appl. No.: 526,099

[22] Filed: May 21, 1990

[30] Foreign Application Priority Data

May 25, 1989 [JP] Japan ................................ 1-132099
Nov. 7, 1989 [JP] Japan ................................ 1-289253

[51] Int. Cl.[5] ........................ F16H 27/02; F16H 29/20

[52] U.S. Cl. ................................ 74/89.15; 74/89.14; 292/201

[58] Field of Search ............................ 74/89.14, 89.15; 292/201, 336.3

[56] References Cited

U.S. PATENT DOCUMENTS

| | | | |
|---|---|---|---|
| 4,135,377 | 1/1979 | Kleefeldt et al. | 292/201 X |
| 4,257,634 | 3/1981 | Kleefeldt et al. | 292/201 X |
| 4,354,396 | 10/1982 | Charles | 74/89.15 X |
| 4,565,104 | 1/1986 | Akin | 74/89.15 |
| 4,723,454 | 2/1988 | Periou et al. | 74/89.15 |
| 4,821,596 | 4/1989 | Eklund | 74/89.15 X |
| 4,825,714 | 5/1989 | Yamanaka et al. | 74/89.15 |
| 4,932,277 | 6/1990 | Beaux | 74/89.15 |
| 4,932,690 | 6/1990 | Kleefeldt et al. | 292/336.3 X |

*Primary Examiner*—Allan D. Herrmann
*Assistant Examiner*—Julie Krolikowski

[57] ABSTRACT

The actuator for a door locking apparatus for a vehicle has an output shaft rotatably mounted on the body thereof, a cylindrical worm designed to be rotated by a motor, and a shaft tube having an internal toothed portion that is brought into mesh engagement with the cylindrical worm and designed to move between locked and unlocked positions along the axial direction of the worm when the worm is rotated. An elongate hole is formed in the arm fixed to the output shaft, and the pin of the shaft tube is brought into engagement with this elongate hole. A projection is provided on the shaft tube at such a position as to be closer to the output shaft than the pin is. The actuator has a torsion spring for returning the shaft tube from the locked or the unlocked position to a neutral position as an intermediate position between the two positions when the motor is switched off. The coil portion of the torsion spring is wound around the outer circumference of the output shaft, and the two legs of the torsion spring are crossed each other, and are thereafter brought into engagement with the projection and a fixed locking piece.

1 Claim, 4 Drawing Sheets

FIG. 9
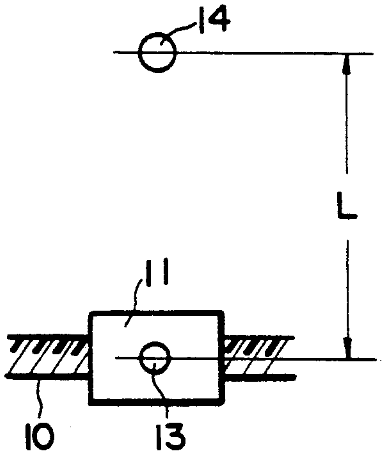
FIG. 10
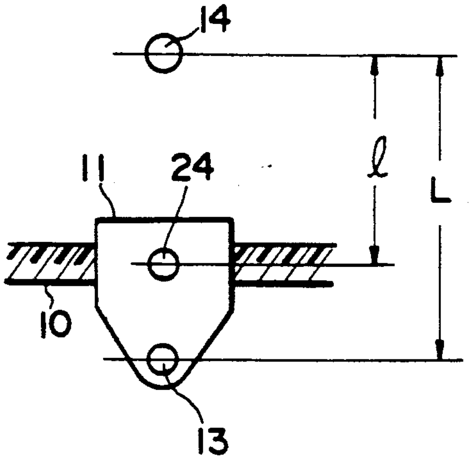
FIG. 11
(PRIOR ART)
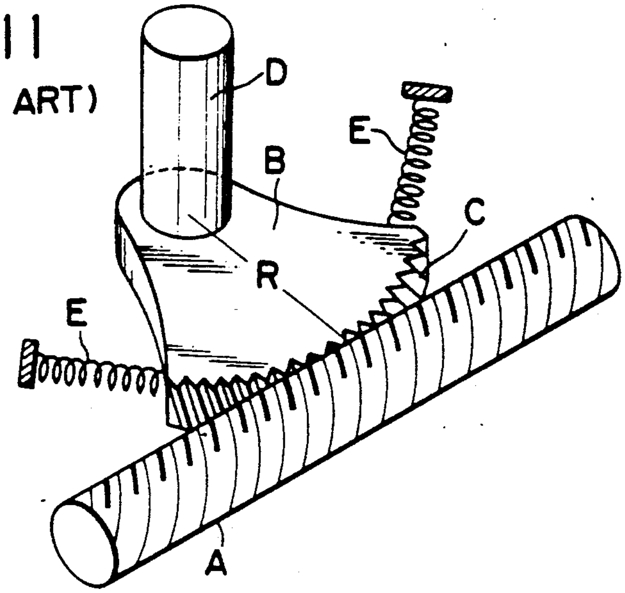
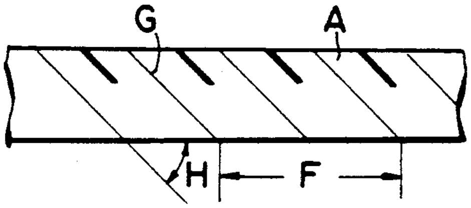
FIG. 12
(PRIOR ART)
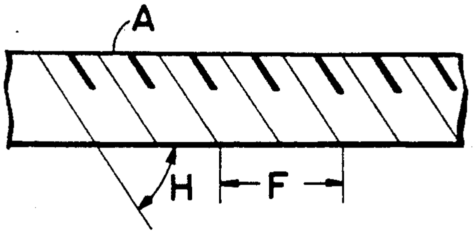
FIG. 13
(PRIOR ART)
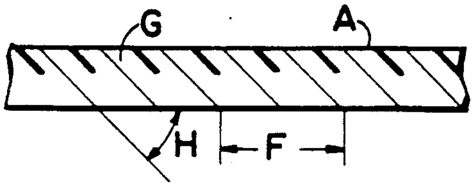
FIG. 14
(PRIOR ART)

ACTUATOR FOR DOOR LOCKING APPARATUS FOR VEHICLE

FIELD OF THE INVENTION

The present invention relates to an actuator for a door locking apparatus for a vehicle. The actuator comprises a motor and a reduction gear mechanism that are formed as an integral part, and when used with a door locking apparatus for a vehicle, the actuator functions as a mechanism for effecting changeover operations between locked and unlocked conditions.

DESCRIPTION OF THE PRIOR ART

Conventionally, motor-driven-actuators have been used for changing over between locked and unlocked conditions in a door locking apparatus, and various types of such construction have been proposed. One example is shown in FIGS. 11 and 12. The actuator shown comprises a cylindrical worm A designed to be rotated by a motor, an arm B having a toothed portion C to be brought into meshing engagement with the cylindrical worm A, an output shaft D connected to a locking lever for a locking apparatus and fixed to the rotational center of the arm B and a pair of springs E for returning the arm B to a neutral position when the motor is switched off.

In this known type of actuator, the radius of the arm B must be longer than a certain length, and this disadvantageously results in a larger actuator in size. The reason will be described below.

The rotational torque of the output shaft D decreases as the radius R of the arm B becomes shorter, while it increases as the lead F (a distance by which the cylindrical worm A axially travels while it rotates once, and this equals double the pitch, since the worm shown in FIG. 11 is a double threaded worm) of the cylindrical worm A becomes shorter. Therefore, in order to reduce the radius R of the arm B without reducing the rotational torque of the output shaft D, the lead F has to be made shorter to an extent that a reduction of rotational torque that will be caused by the reduction of the radius R can be compensated for (FIG. 13). However, the shorter the lead F is made, the less inclined the screw threads G of the worm A become, and since a helical angle H (an angle formed between the shaft axis and the screw thread) becomes more obtuse, it becomes more difficult for the elastic force of the springs D to return the arm B to the neutral position.

In contrast, as shown in FIG. 14, it is possible to reduce the lead F by reducing the diameter of the cylindrical worm A with the same helical angle as that shown in FIG. 12 being maintained. Thus, if the lead F is reduced while reducing the diameter of the worm A, it is possible to reduce the radius R of the arm B without reducing the rotational torque of the output shaft D. However, the shaft of the worm A becomes easier to bend as the cylindrical worm A is made thinner, and in this case there will be a risk that the toothed portion C of the arm B cannot properly mesh with the worm A.

Therefore, it has not been possible to reduce the radius R of the arm B to below a certain length.

SUMMARY OF THE INVENTION

Consequently, an object of the present invention is to provide an actuator for a locking apparatus that can be made smaller by reducing the radius of an arm.

Another object of the present invention is to provide an actuator for a locking apparatus that can exhibit greater output by improving a spring for returning the arm to a neutral position.

BRIEF DESCRIPTION OF THE DRAWINGS

FIGS. 9 and 10 are explanatory diagrams explaining the rotation torque of the output shaft, and FIGS. 11 to 14 show examples of the prior art actuators.

DETAILED DESCRIPTION OF THE INVENTION

Figure 1:
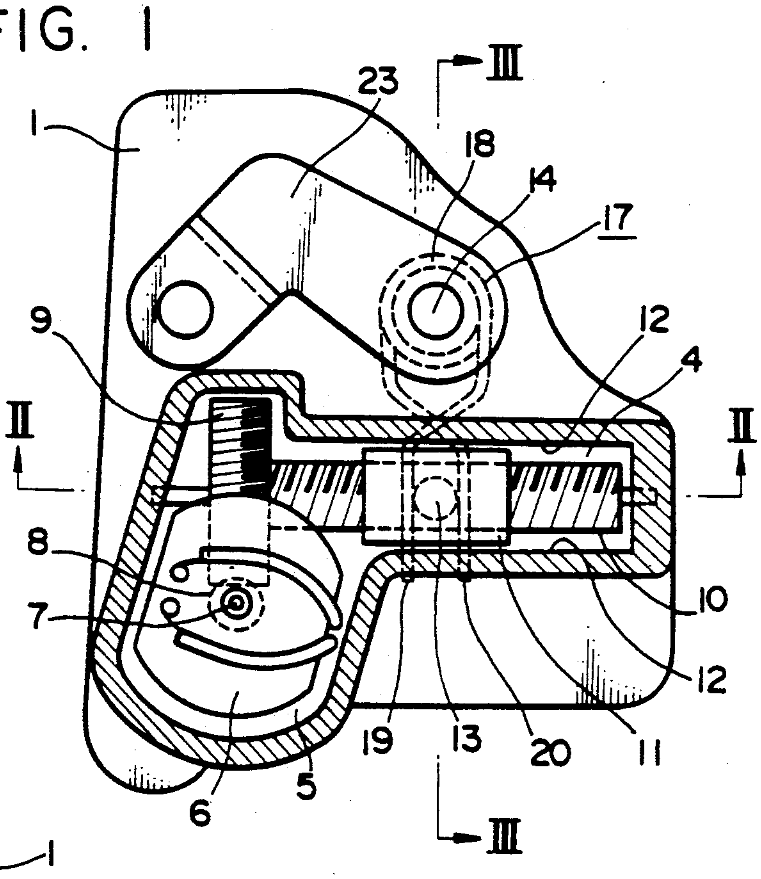
FIG. 1 is a plan view, partly in transverse cross section, of the actuator of the present invention.
Figure 2:
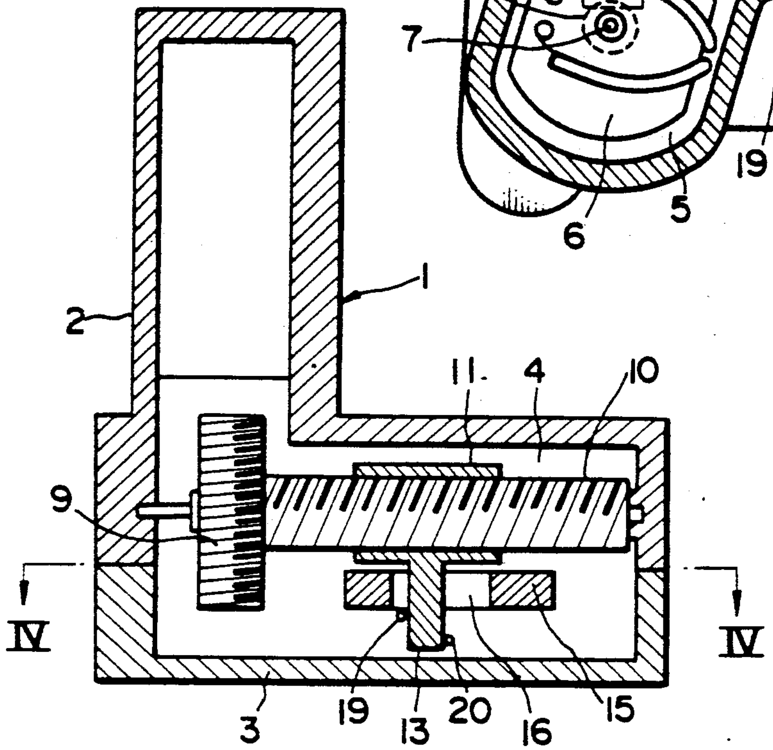
FIG. 2 is a sectional view taken along the line II—II of FIG. 1.
Figure 3:
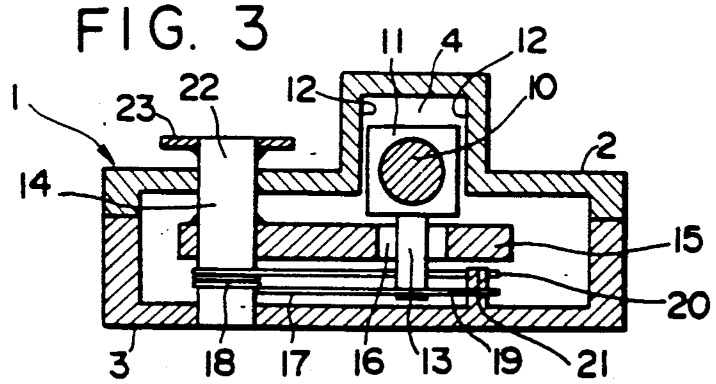
FIG. 3 is a sectional view taken along the line III—III of FIG. 1.

Referring to the drawings, one embodiment of the present invention will be described. The body 1 of an actuator is made from synthetic resin, and in some cases it is formed so as to be integral with the body of a locking apparatus containing a latch, a ratchet, locking lever and so forth, and in other cases it is formed as a separate unit.

The body 1 has an upper case 2 and a lower case 3, and a guide groove 4 and a motor chamber 5 for accommodating therein a motor 6 are formed in the upper case 2.

A gear 8 is fixed to the rotational shaft 7 of the motor 6 (FIG. 6), and a gear 9 is brought into mesh engagement with this gear 8. A small-diameter multiple thread cylindrical worm 10 is fixed to the center of the gear 9, and the worm 10 is rotatably mounted on the body 1. A shaft tube 11 having internal teeth formed on the inside thereof is fitted over the worm 10 in such a manner as to come into mesh engagement with the worm 10. This shaft tube 11 is formed into such a size as to be housed entirely in the guide groove 4. The shaft tube 11 is constructed such that when the cylindrical worm 10 is rotated, the shaft tube 11 is brought into abutment with the side wall 12 of the guide groove 4, the rotation thereof being thereby prevented, and that instead the shaft tube 11 travels in an axial direction of the cylindrical worm 10. The shaft tube 11 moves between a locked position (FIG. 5) on the left-hand side and an unlocked position (not shown) on the right-hand side with the neutral position shown in FIG. 4 being the center of such a movement. The shaft tube 11 moving construction may be attained by various types of mechanisms, and the shaft tube 11 may be engaged with the body 1 via a spline.

A pin 13 is formed on the shaft tube 11 in such a manner as to downwardly protrude therefrom. This pin 13 may be formed either from synthetic resin or of metal, but it is preferably formed from synthetic resin as an integral part of the shaft tube 11.

An output shaft 14 is provided in the vicinity of the shaft tube 11. This output shaft 14 is rotatably fixed to the body 1, and an arm 15 having a small radius is secured to the output shaft 14. An arc-shaped elongate hole 16 is formed about the output shaft 14 in the distal end of the arm 15, and the pin 13 of the shaft tube 11 is inserted into this elongate hole 16. The length of the elongate hole 16 is such that the pin 13 is not brought into abutment with the elongate hole 16 when the shaft tube is returned to the neutral position both from a locked and from an unlocked position.

The coil portion 18 of a torsion spring 17 is wound around the output shaft 14, and the legs 19, 20 of the torsion spring 17 are crossed. Thereafter, the crossed legs are brought into engagement with the pin 13 and a locking piece 21 formed on the lower case 3, respectively. In this construction, therefore, when the motor 6 is in an off-state, the shaft tube 11 is returned by the torsion spring 17 to such a position as to allow the output shaft 14, pin 13 and locking piece 21 to be in alignment with each other.

A rotating lever 23 is fixed to a protruding portion 22 of the output shaft 14, and this rotating lever 23 is connected to the locking lever of the locking apparatus.

Figure 7:
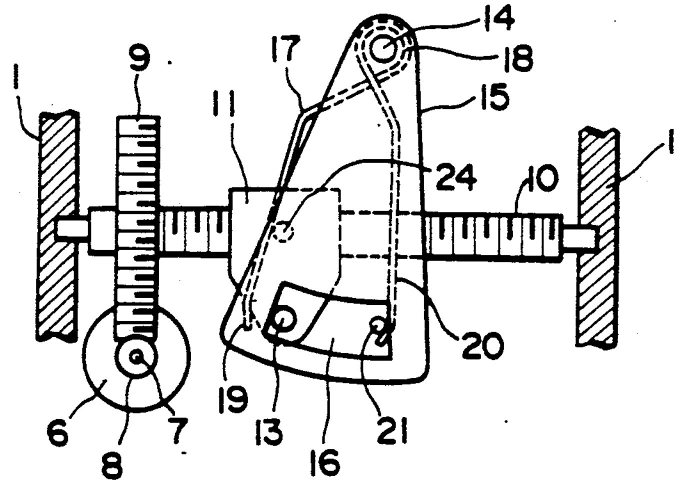
FIG. 7 is a plan view of the actuator employing another type of shaft tube.
Figure 8:
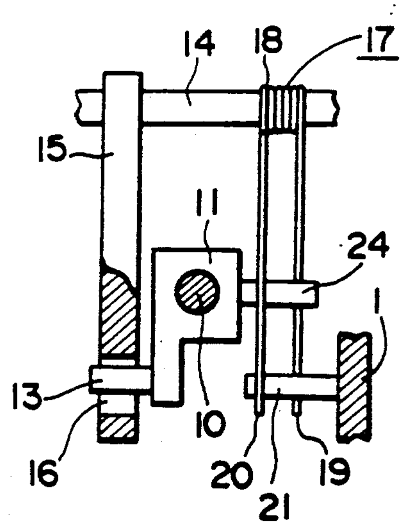
FIG. 8 is a side view of the actuator employing another type of shaft tube.

A different type of shaft tube is employed in another embodiment of the present invention shown in FIGS. 7, 8. In this embodiment, on top of the pin 13 that is brought into engagement with the elongate hole 16 of the arm 15, a projection 24 is formed on the shaft tube 11*a* in such a manner as to project in a direction opposite to one in which the pin 13 projects from the shaft tube 11*a*. Being crossed, the legs 19, 20 of the torsion spring 17 are brought into engagement with the projection 24 and the locking piece 21 formed on the lower case 3, respectively. The projection 24 is provided closer to the output shaft 14 than the pin 13.

The operation of the present invention will now be described.

Figure 4:
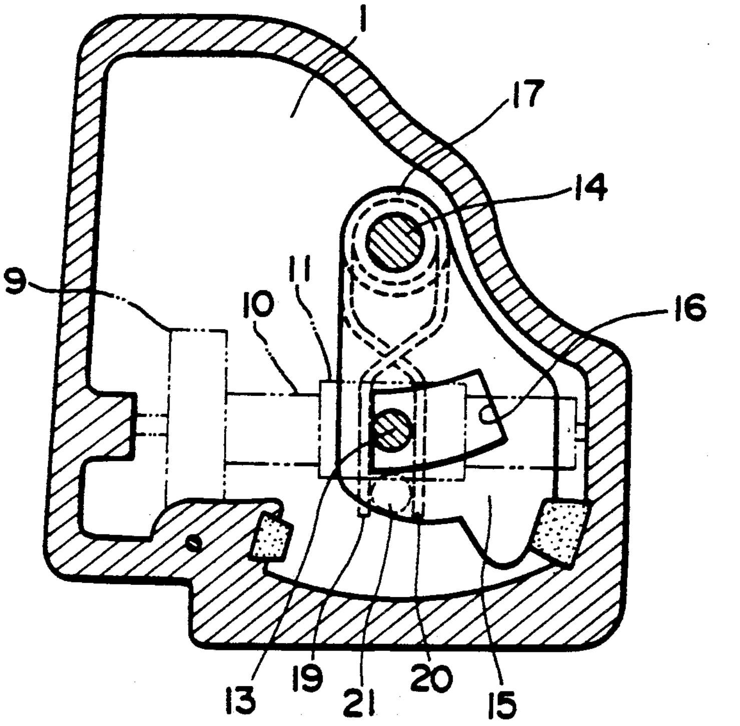
FIG. 4 is a sectional view taken along the line IV—IV of FIG. 2.

FIG. 4 shows a state in which the arm 15 is located at the right-most unlocked position with the shaft tube 11 being held at the neutral position by means of the spring 17. With a view to changing over the condition of the locking apparatus from this condition to a locked condition, when the motor is switched on, the cylindrical worm 10 is rotated by the gear 8 via the gear 9, and the shaft tube 11 is moved to the left-hand side. When the shaft tube 11 is so moved, the pin 13 of the shaft tube 11 is brought into abutment with the elongate hole 16 of the arm 15, and the arm 15 is then rotated. In synchronism with this, the leg 19 of the torsion spring 17 is widened so as to actuate the rotating lever 23 fixed to the output shaft 14, the locking apparatus being thereby changed over to a locked condition (FIG. 5).

In this operation, since the shaft tube 11 is fitted over the cylindrical worm 10 in such a manner as to be mesh engaged with the same worm around the circumference thereof, even if the diameter of the worm 10 is reduced, good mesh engagement can be obtained between the shaft tube 11 and the worm A without any mismeshed engagement. Therefore, the lead can be reduced with a predetermined helical angle being maintained, and in addition, the radius of the arm 15 can also be reduced without any reduction of the rotational torque of the output shaft 14.

Figure 5:
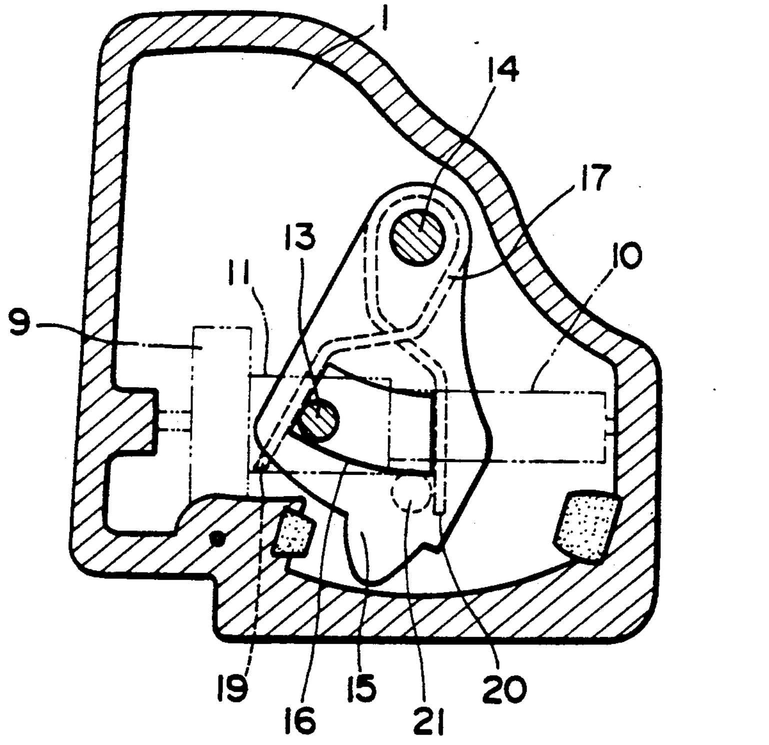
FIG. 5 is a drawing showing a state in which a motor is energized to effect a locking operation.
Figure 6:
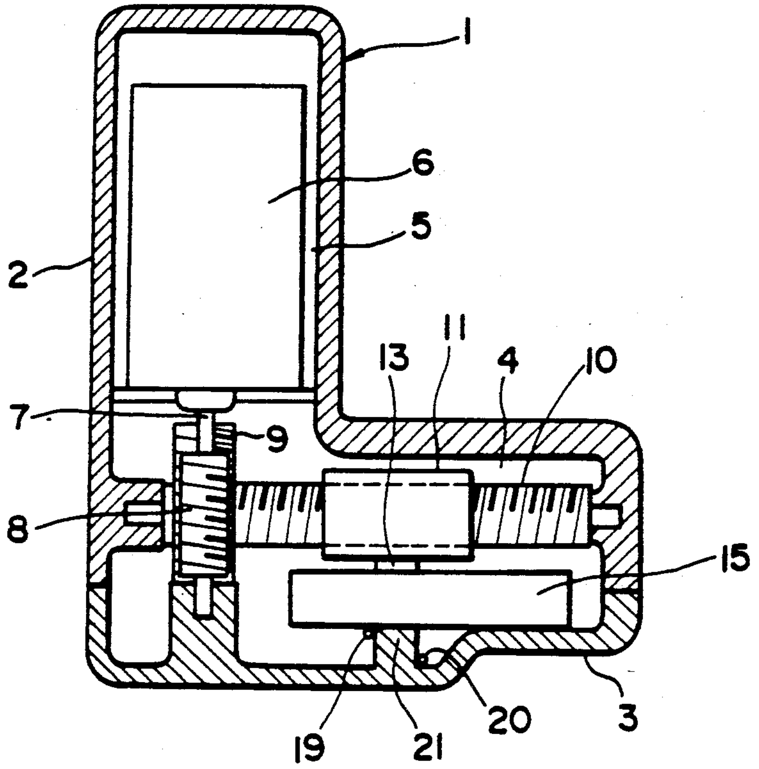
FIG. 6 is a development view of the actuator in section.

In a state shown in FIG. 5, when the motor 6 is switched off, the shaft tube 11 is restored to the neutral position by the leg 19 of the torsion spring 17. In this state, the pin 13 of the shaft tube 11 is being disengaged from the elongate hole 16, and due to this, the torsion spring 17 needs a force to rotate the worm 10 via the shaft tube 11.

Let us now assume that the distance between the output shaft 14 and the pin 13 be L, that the force applied to the shaft tube 11 by the motor so as to move the shaft tube is F, and that the force applied to the pin 13 of the shaft tube 11 by the torsion spring 17 so as to return the shaft tube 11 to the neutral position is f, the rotational torque M of the output shaft 14 is obtained.

$$\begin{aligned} M &= F \times L - f \times L \\ &= (F - f)L \end{aligned}$$

It is clear from this that the longer the distance L becomes, the greater the rotational torque M becomes, and in addition, the smaller the force f of the spring 17 becomes, the greater the rotational torque becomes.

As described above, however, in order to make an actuator smaller, the distance L needs to be reduced, and in contrast, if the force f of the spring 17 is reduced, the shaft tube 11 cannot be returned to the neutral position. The spring 17 needs the force f at the portion where it is brought into abutment with the pin 13 irrespective of the distance L.

From this, as shown in FIGS. 7, 8, and 10, the pin 13 for rotating the arm 15 and the projection 24 with which the spring 17 is brought into engagement are formed as separate units, and let the distance between the output shaft 14 and the projection 24 be l, $$\begin{aligned} M &= F \times L - f \times l \\ &= F \times L - f \times L + f(L - l) \end{aligned}$$

In this $l < L$ relation, the torque M of the output shaft 14 can be increased without increasing the distance L and without reducing the force f of the spring 17.

We claim:

1. An actuator for a door locking apparatus for a vehicle having:
   - an output shaft rotatably mounted on the body of said actuator;
   - a cylindrical worm rotatable by means of a motor;
   - a shaft tube having an internal toothed portion that is brought into mesh engagement with said cylindrical worm for movement between locked and unlocked positions along the axial direction of said worm when said worm is rotated; and
   - an arm fixed to said output shaft for engagement with said shaft tube so as to rotate said output shaft when said shaft tube is moved;
   - wherein said actuator has a spring for returning said shaft tube from said locked or said unlocked position to a neutral position as an intermediate position between said locked and unlocked positions when said motor is switched off;
   - wherein a pin is formed on said shaft tube;
   - wherein an elongate hole is formed in said arm for engagement with said pin, said elongate hole having such a length as to prevent the abutment with said pin when said shaft tube is restored to said neutral position; and
   - wherein a projection is formed on said shaft tube at such a position as to be closer to said output shaft than said pin is, wherein said spring comprises a torsion spring comprising in turn a coil portion and two legs, wherein said coil portion is wound around the outer circumference of said output shaft, and wherein said two legs are crossed each other, and are thereafter brought into engagement with said projection and a fixed locking piece.

* * * * *